United States Patent
Zhang et al.

(10) Patent No.: US 11,417,235 B2
(45) Date of Patent: Aug. 16, 2022

(54) LISTEN, INTERACT, AND TALK: LEARNING TO SPEAK VIA INTERACTION

(71) Applicant: Baidu USA, LLC, Sunnyvale, CA (US)

(72) Inventors: Haichao Zhang, Sunnyvale, CA (US); Haonan Yu, Sunnyvale, CA (US); Wei Xu, Saratoga, CA (US)

(73) Assignee: Baidu USA LLC, Sunnyvale, CA (US)

( * ) Notice: Subject to any disclaimer, the term of this patent is extended or adjusted under 35 U.S.C. 154(b) by 1200 days.

(21) Appl. No.: 15/821,452

(22) Filed: Nov. 22, 2017

(65) Prior Publication Data

US 2018/0342174 A1 Nov. 29, 2018

Related U.S. Application Data

(60) Provisional application No. 62/511,295, filed on May 25, 2017.

(51) Int. Cl.
| | |
|---|---|
| *G06N 3/08* | (2006.01) |
| *G06K 9/62* | (2022.01) |
| *G06N 3/04* | (2006.01) |
| *G06N 3/00* | (2006.01) |
| *G06F 40/35* | (2020.01) |

(Continued)

(52) U.S. Cl.
CPC ............ *G09B 19/04* (2013.01); *G06F 40/216* (2020.01); *G06F 40/35* (2020.01); *G06F 40/40* (2020.01); *G06F 40/56* (2020.01); *G06K 9/6262* (2013.01); *G06N 3/006* (2013.01); *G06N 3/0445* (2013.01); *G06N 3/0454* (2013.01); *G06N 3/08* (2013.01); *G09B 5/06* (2013.01); *G09B 5/12* (2013.01);

(Continued)

(58) Field of Classification Search
None
See application file for complete search history.

(56) References Cited

U.S. PATENT DOCUMENTS

| | | | |
|---|---|---|---|
| 9,619,748 B1 * | 4/2017 | Commons | ................ G06N 3/08 |
| 10,467,274 B1 * | 11/2019 | Ren | ...................... G06K 9/4604 |

(Continued)

FOREIGN PATENT DOCUMENTS

| | | |
|---|---|---|
| CN | 103942990 A | 7/2014 |
| CN | 106611048 A | 5/2017 |
| WO | 2016187472 A1 | 11/2016 |

OTHER PUBLICATIONS

Abhishek Das; "Learning Cooperative Visual Dialog Agents with Deep Reinforcement Learning"; Mar. 2017; https://arxiv.org/pdf/1703.06585.pdf (Year: 2017).*

(Continued)

*Primary Examiner* — Robert J Utama
*Assistant Examiner* — Correll T French
(74) *Attorney, Agent, or Firm* — North Weber & Baugh LLP

(57) ABSTRACT

Described herein are systems and methods for grounded natural language learning in an interactive setting. In embodiments, during a learning process, an agent learns natural language by interacting with a teacher and learning from feedback, thus learning and improving language skills while taking part in the conversation. In embodiments, a model is used to incorporate both imitation and reinforcement by leveraging jointly sentence and reward feedback from the teacher. Various experiments are conducted to validate the effectiveness of a model embodiment.

20 Claims, 11 Drawing Sheets

(51) Int. Cl.

| | |
|---|---|
| *G06F 40/40* | (2020.01) |
| *G06F 40/56* | (2020.01) |
| *G06F 40/216* | (2020.01) |
| *G09B 19/04* | (2006.01) |
| *G09B 5/06* | (2006.01) |
| *G09B 5/14* | (2006.01) |
| *G09B 5/12* | (2006.01) |
| *G09B 7/04* | (2006.01) |

(52) U.S. Cl.
CPC ............... *G09B 5/125* (2013.01); *G09B 5/14* (2013.01); *G09B 7/04* (2013.01)

(56) References Cited

U.S. PATENT DOCUMENTS

| | | | | |
|---|---|---|---|---|
| 10,699,129 | B1* | 6/2020 | Jiang | G06K 9/00718 |
| 10,726,206 | B2* | 7/2020 | Sigal | G06F 40/216 |
| 10,860,629 | B1* | 12/2020 | Gangadharaiah | H04L 51/02 |
| 2016/0098844 | A1* | 4/2016 | Shaji | G06T 9/00 382/156 |
| 2016/0342895 | A1* | 11/2016 | Gao | G06N 3/0445 |
| 2017/0124432 | A1* | 5/2017 | Chen | G06F 40/30 |
| 2017/0127016 | A1* | 5/2017 | Yu | G06N 3/0445 |
| 2017/0147910 | A1* | 5/2017 | Mao | G06N 3/0445 |
| 2017/0200065 | A1* | 7/2017 | Wang | G06K 9/6274 |
| 2017/0278018 | A1* | 9/2017 | Mnih | G06N 3/0454 |
| 2018/0060301 | A1* | 3/2018 | Li | G06N 3/08 |
| 2018/0068198 | A1* | 3/2018 | Savvides | G06K 9/6274 |
| 2018/0107685 | A1* | 4/2018 | Kale | G06F 16/51 |
| 2018/0140203 | A1* | 5/2018 | Wang | A61B 5/369 |
| 2018/0157747 | A1* | 6/2018 | Tiwary | G06N 3/08 |
| 2018/0189635 | A1* | 7/2018 | Olarig | G06F 16/9038 |
| 2019/0073353 | A1* | 3/2019 | Yu | G06F 40/211 |
| 2019/0130206 | A1* | 5/2019 | Trott | G06N 3/006 |
| 2019/0147355 | A1* | 5/2019 | Rennie | G06N 5/046 706/47 |
| 2019/0318648 | A1* | 10/2019 | Zhang | G09B 19/06 |
| 2020/0342236 | A1* | 10/2020 | Gong | G06K 9/627 |
| 2021/0056422 | A1* | 2/2021 | Thakker | G06F 17/18 |

OTHER PUBLICATIONS

Simonyan; "Very Deep Convolutional Networks for Large-Scale Image Recognition"; Apr. 10, 2015; https://arxiv.org/pdf/1409.1556.pdf (Year: 2015).*

Britz; "Attention and Memory in Deep Learning and NLP"; http://www.wildml.com/2016/01/attention-and-memory-in-deep-learning-and-nlp/ (Year: 2016).*

Bahdanau; "Neural Machine Translation by Jointly Learning to Align and Translate"; https://arxiv.org/pdf/1409.0473.pdf; May 2016 (Year: 2016).*

Strub et al., End-to-end optimization of goal-driven and visually grounded dialogue systems, In IJCAI, 2017. (7 pgs).

Sukhbaatar et al.,"Learning multiagent communication with backpropagation," In NIPS, Retrieved from Internet<URL:https://arxiv.org/pdf/1605.07736.pdf>, 2016. (12 pgs).

Sutskever et al., "Sequence to sequence learning with neural networks," In NIPS, 2014. (9 pgs).

Sutton & Barto, "Reinforcement Learning: An Introduction," MIT Press, 1998. Retrieved from Internet<URL: http://neuro.bstu.by/ai/RL-3.pdf>, [Retrived on May 6, 2019]. (5 pgs).

Vinyals & Le, "A neural conversational model," Retrieved from Internet<URL: https://arxiv.org/pdf/1506.05869v1.pdf>, 2015. (7pgs).

Vinyals et al., "Show and tell: A neural image caption generator," In CVPR, 2015. (9 pgs).

Wen et al.,"Semantically conditioned LSTM-based natural language generation for spoken dialogue systems," In EMNLP, 2015. (11 pgs).

J. Weston,"Dialog-based language learning," In NIPS, 2016. (9 pgs).

C. D. Yang,"Knowledge and Learning in Natural Language," Oxford University Press UK, 2003. (2 pgs).

Yu et al., "Video paragraph captioning using hierarchical recurrent neural networks," Retrieved from Internet<URL: https://arxiv.org/pdf/1510.07712v1.pdf>, 2015. (11 pgs).

J. Li et al.,"Learning through dialogue interactions," Retrieved from Internet<URL:https://arxiv.org/pdf/1612.04936v3.pdf>, 2017. (16 pgs).

J. Li et al.,"Adversarial learning for neural dialogue generation," Retrieved from Internet<URL: https://arxiv.org/pdf/1701.06547v1.pdf>, 2017. (13 pgs).

J. Mao et al.,"Deep captioning with multimodal recurrent neural networks," (m-RNN). ICLR, 2015. (17 pgs).

V. Mnih et al.,"Playing Atari with deep reinforcement learning," Retrieved from Internet<URL:https://arxiv.org/pdf/1312.5602.pdf>, 2013. (9 pgs).

Mordatch et al.,"Emergence of grounded compositional language in multi-agent populations," Retrieved from Internet<URL:https://arxiv.org/pdf/1703.04908v1.pdf>, 2017. (10 pgs).

Petursdottir et al.,"Reinforcement contingencies in language acquisition," Policy Insights from the Behavioral and Brain Sciences, 4(1):25-32, 2017. (8 pgs).

Ranzato et al.,"Sequence level training with recurrent neural networks," Retrieved from Internet<URL: https://arxiv.org/pdf/1511.06732v1.pdf>, 2015. (14 pgs).

Serban et al., "Building end-to-end dialogue systems using generative hierarchical neural network models," In AAAI, 2016. (8 pgs).

B. F. Skinner,"Verbal Behavior", Harvard University Press, 1948, Retrieved from Internet<URL: ttp://www.behavior.org/resources/595.pdf>, [Retrived May 6, 2019]. (6 pgs).

Stadie et al., "Third-person imitation learning," Retrieved from Internet<URL: https://arxiv.org/pdf/1703.01703.pdf>, 2017. (16 pgs).

Office Action dated Oct. 21, 2019, in Japanese Patent Application No. JP2018049699A. (6pgs).

Directory to Proceedings of the 22nd Annual Meeting of the Association for Natural Language Processing, [online], [Retrieved Oct. 21, 2019] Retrieved from Internet <URL: https://www.anlp.jp/proceedings/annual_meeting/2016/html/biblio.html> (7pgs).

Yu et al., "SeqGAN: Sequence generative adversarial nets with policy gradient," In AAAI, 2017. ( 7pgs).

The Extended European Search Report dated Oct. 12, 2018, in International Patent Application No. EP 18162246.5-1221. (11 pgs).

Das et al., "Learning Cooperative Visual Dialog Agents with Deep Reinforcement Learning," Arxiv.Org, Cornell University Library, 201 Olin Library Cornell University Ithaca, NY 14853, Mar. 20, 2017 (Mar. 20, 2017), Xp080758161, Doi: 10.1109/Iccv.2017.321. Retrieved from Internet<URL: https://arxiv.org/pdf/1703.06585v2.pdf>. (11 pgs).

Xu et al., "Ask, Attend and Answer: Exploring Question-Guided Spatial Attention for Visual Question Answering," Sep. 16, 2016 (Sep. 16, 2016), Medical Image Computing & Computer-Assisted Intervention—Miccai 2015 : 18th International Conference, Munich, Germany, Oct. 5-9, 2015; Proceedings; [Lecture Notes In Computer Science; Lect. Notes Computer], Springer International Publishing, Ch, Xp047355151, ISSN: 0302-9743 ISBN: 978-3-030-00888-8 [Retrieved on Sep. 16, 2016] (16pgs).

Sascha Lange et al., "Autonomous Reinforcement Learning On Raw Visual Input Data In A Real World Application," Neural Networks (IJCNN), The 2012 International Joint Conference on, IEEE, Jun. 10, 2012 (Jun. 10, 2012), pp. 1-8, Xp032210518, DOI: 10.1109/IJCNN.2012.6252823 ISBN: 978-1-4673-1488-6 (8pgs).

J.Weston, "Dialog-Based Language Learning," Apr. 20, 2016 (Apr. 20, 2016), XP055511231, Retrieved from the Internet <URL:https://arxiv.org/pdf/1604.06045.pdf> [retrieved on Oct. 2, 2018]. (10pgs).

Li et al., "Learning Through Dialogue Interactions By Asking Questions," Dec. 5, 2016 (Dec. 15, 2016), XP055511357, Retrieved from the Internet: <URL:https://arxiv.org/pdf/1612.04936.pdf> [retrieved on Oct. 2, 2018]. (16pgs).

He et al., "Deep Reinforcement Learning With An Action Space Defined By Natural Language," ICLR 2016 Workshop, Feb. 14, 2016 (Feb. 14, 2016), XP055468351, DOI: 10.1007/S40614-017-

(56) References Cited

OTHER PUBLICATIONS 0118-5, Retrieved From The Internet:<URL:https://openreview.net/pdf?id=WL9AjgWvPf5zMX2Kfoj5> [Retrieved On Apr. 18, 2018] (17pgs).

Andrychowicz et al.,"Learning to learn by gradient descent by gradient descent," In NIPS, 2016.(9pgs).

Antol et al., "VQA: Visual Question Answering," Retrieved from Internet <URL: https://arxiv.org/pdf/1505.00468v1.pdf>, 2015. (16pgs).

Bahdanau et al.,"An actor-critic algorithm for sequence prediction," In ICLR, 2017. (17pgs).

Das et al.,"Learning cooperative visual dialog agents with deep reinforcement learning," Retrieved from Internet: <URL: https://arxiv.org/pdf/1703.06585v1.pdf>, 2017. (11 pgs).

Duchi et al.,"Adaptive subgradient methods for online learning and stochastic optimization," Journal of Machine Learning Research, 12:2121-2159, 2011. (39pgs).

Foerster et al.,"Learning to communicate with deep multi-agent reinforcement learning," In NIPS, 2016. (9 pgs).

J. He et al.,"Deep reinforcement learning with a natural language action space," In ACL, 2016. (10 pgs).

P. K. Kuhl,"Early language acquisition: cracking the speech code," Nat Rev Neurosci, 5(2):831-843, 2004. (16pgs).

Lazaridou et al.,"Multi-agent cooperation and the emergence of (natural) language," In ICLR, 2017. (11 pgs).

J. Li et al.,"Deep reinforcement learning for dialogue generation," In EMNLP, 2016. (11 pgs).

Office Action dated Jun. 28, 2021, in Chinese Patent Application No. 201810188188.5A. (28pgs).

Das et al.,"Learning Cooperative Visual Dialog Agents with Deep Reinforcement Learning," arXiv preprint arXiv: 1703.06585, 2017. (11pgs).

\* cited by examiner

100

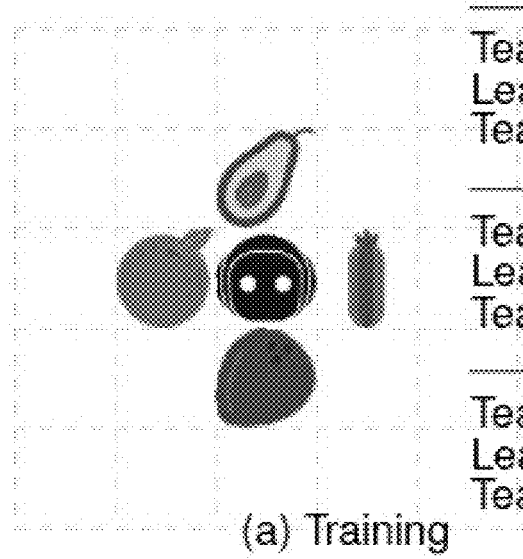

———question-answer-feedback———
Teacher: *what is on the north*
Learner: *on . cabbage yes east*
Teacher: *on the north is avocado* [−]
———statement-repeat-feedback———
Teacher: *on the west is orange*
Learner: *on the west is apple*
Teacher: *no orange is on the west* [−]
———learner-statement-feedback———
Teacher: *.*
Learner: *cucumber is on the east*
Teacher: *cucumber is on the east* [+]

(a) Training

FIG. 1A

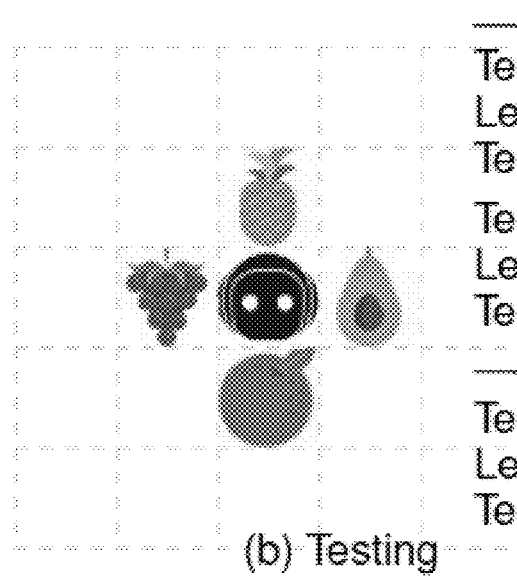

———compositional-generalization———
Teacher: *what is on the east*
Learner: *avocado is on the east*
Teacher: *yes on the east is avocado*

Teacher: *where is avocado*
Learner: *avocado is on the east*
Teacher: *yes avocado is on the east*
———knowledge-transferring———
Teacher: *what is on the south*
Learner: *on the south is orange*
Teacher: *yes orange is on the south*

(b) Testing

FIG. 1B

LISTEN, INTERACT, AND TALK: LEARNING TO SPEAK VIA INTERACTION

CROSS-REFERENCE TO RELATED APPLICATION

This application claims the priority benefit under 35 USC § 119(e) to U.S. Provisional Patent Application No. 62/511,295, filed on 25 May 2017, entitled "Listen, Interact, and Talk: Learning to Speak via Interaction", and listing Haichao Zhang, Haonan Yu, and Wei Xu as inventors. The aforementioned patent document is incorporated by reference herein in its entirety.

BACKGROUND

A. Technical Field

The present disclosure relates generally to systems and methods for computer learning that can provide improved computer performance, features, and uses.

B. Background

Natural language is the one of the most natural form of communication for human, and therefore it is of great value for an intelligent agent to be able to leverage natural language as the channel to communicate with human as well. Recent progress on natural language learning mainly relies on supervised training with large scale training data, which typically requires a huge amount of human labor for annotating. While promising performance has been achieved in many specific applications regardless of the labeling effort, this is very different from how humans learn. Humans act upon the world and learn from the consequences of their actions. For mechanical actions such as movement, the consequences mainly follow geometrical and mechanical principles, while for language, humans act by speaking and the consequence is typically response in the form of verbal and other behavioral feedback (e.g., nodding) from conversation partners. This feedback typically contains informative signal on how to improve the language skills in subsequent conversions and play an important role in human's language acquisition process.

One of the long-term goals of artificial intelligence is to build an agent that can communicate intelligently with human in natural language. Most existing work on natural language learning relies heavily on training over a pre-collected dataset with annotated labels, leading to an agent that essentially captures the statistics of the fixed external training data. As the training data is essentially a static snapshot representation of the knowledge from the annotator, the agent trained this way is limited in adaptiveness and generalization of its behavior. Moreover, this is very different from the language learning process of humans, where language is acquired during communication by taking speaking action and learning from the consequences of speaking action in an interactive manner.

Accordingly, what is needed are systems and methods for grounded natural language learning in an interactive setting, which improves the functioning of computing devices for machine learning.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may not be to scale.

FIG. 1A-B depicts several interactive language learning examples with FIG. 1A showing training situation and FIG. 1B showing testing situation according to embodiments of the present disclosure.

DETAILED DESCRIPTION OF EMBODIMENTS

Figure 2:
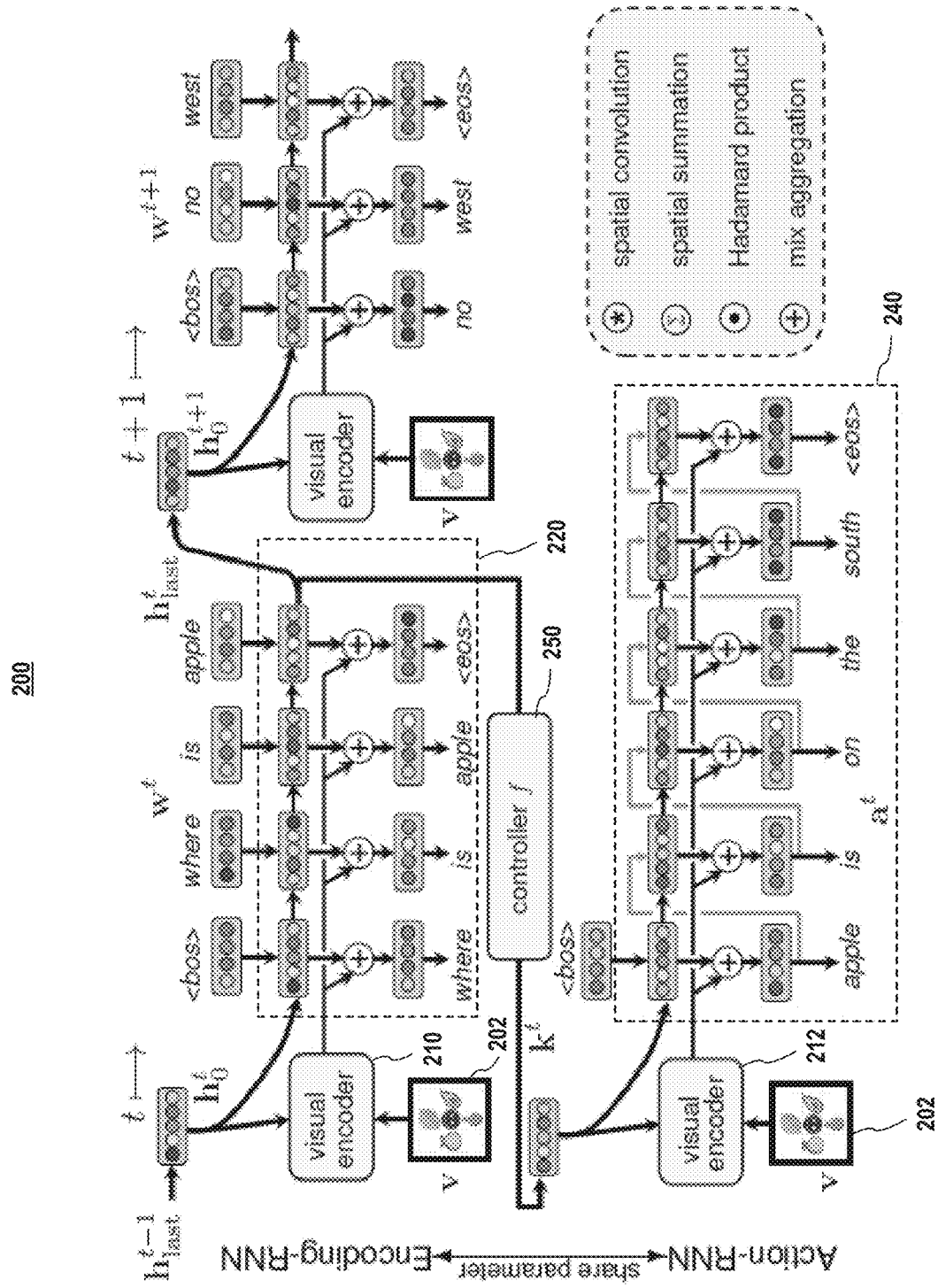
FIG. 2 graphically depicts a network structure of a hierarchical-RNN-based model according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. It shall be noted that references to "sentence" shall be understood to mean any set of one or more words whether or not they form a proper, complete sentence in a formal sense; neither does a "sentence" as used herein require correct capitalization and/or punctuation.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each document mentioned in this patent disclosure is incorporate by reference herein in its entirety.

Furthermore, one skilled in the art shall recognize that: (1) certain steps may optionally be performed; (2) certain steps may not be limited to the specific order set forth herein; (3) certain steps may be performed in different orders; and (4) certain steps may be done concurrently.

It shall be noted that any experiments and results presented herein are provided by way of illustration and were performed under specific conditions using a specific embodiment or embodiments; accordingly, neither the included experiments nor their results shall be used to limit the scope of the disclosure of the current patent document.

A. Introduction

Natural language is the one of the most natural form of communication for human, and therefore it is of great value for an intelligent agent to be able to leverage natural language as the channel to communicate with human as well. Recent progress on natural language learning mainly relies on supervised training with large scale training data, which typically requires a huge amount of human labor for annotating. While promising performance has been achieved in many specific applications regardless of the labeling effort, this is very different from how humans learn. Humans act upon the world and learn from the consequences of their actions. For mechanical actions such as movement, the consequences mainly follow geometrical and mechanical principles, while for language, humans act by speaking and the consequence is typically response in the form of verbal and other behavioral feedback (e.g., nodding) from conversation partners. This feedback typically contain informative signal on how to improve the language skills in subsequent conversions and play an important role in human's language acquisition process.

The language acquisition process of a baby is both impressive as a manifestation of human intelligence and inspiring for designing novel settings and algorithms for computational language learning. For example, baby interacts with people and learn through mimicking and feedback. For learning to speak, baby initially performs verbal action by mimicking his conversational partner (e.g., parent) and masters the skill of generating a word (sentence). He could also possibly pick up the association of a word with a visual image when his parents saying "this is apple" while pointing to an apple or an image of it. Later, one can ask the baby question like "what is this" while pointing to an object, and provides the correct answer if the baby doesn't respond or responds incorrectly, which is typical in the initial stage. One can also provide at the same time a verbal confirmation (e.g., "yes/no") with a nodding/smile/kiss/hug when he answers correctly as a form of encouragement feedback. From a baby's perspective, the way to learn the language is by making verbal utterances to parent and adjusting his verbal behavior according to the corrections/confirmation/encouragement from parent.

This example illustrates that the language learning process is inherently interactive, a property which is potentially difficult to be captured by a static dataset as used in the conventional supervised learning setting. Inspired by baby's language learning process, embodiments of a novel interactive setting are presented for grounded natural language learning, where the teacher and the learner can interact with each other in natural languages as shown in FIG. 1.

FIG. 1A shows that during training, a teacher interacts in natural language with a learner about objects. The interactions are in the form of: (1) question-answer-feedback, (2) statement-repeat-feedback, or (3) statement from learner and then feedback from teacher. In embodiments, certain forms of interactions may be excluded for certain set of object-direction combinations or objects (referred to as inactive combinations/objects) during training. For example, the combination of {avocado, east} does not appear in question-answer sessions; the object orange never appears in question-answer sessions but only in statement-repeat sessions. The teacher provides both sentence feedback as well as reward signal (denoted as [+] and [−] in the figure). FIG. 1B shows that during testing, the teacher can ask question about objects around, including questions involving inactive combinations/objects that have never been asked before, e.g., questions about the combination of {avocado, east} and questions about orange. This testing setup involves compositional generalization and knowledge transferring settings and is used for evaluating the proposed approach (see Section D).

In this setting, there is no direct supervision to guide the behavior of the learner as in the supervised learning setting. Instead, the learner has to act in order to learn, i.e., engaging in the conversation with currently acquired speaking skills to obtain feedback from the dialogue partner, which provide learning signals for further improvement on the conversation skills.

To leverage the feedback for learning, it is tempting to mimic the teacher directly (e.g., using a language model). While this is a viable approach for learning how to speak, the agent trained by pure imitation is not necessarily able to converse adaptively within context due to the negligence of the reinforcement signal. An example is that it is hard to make a successful conversation with a well-trained parrot, which is only good at mimicking. The reason is that the learner is mimicking from a third person perspective, mimicking the teacher who is conversing with it, thus certain words in the sentences from the teacher such as "yes/no" and "you/I" might need to be removed/adapted due to the change of perspective from teacher to learner. This cannot be achieved with imitation only. On the other hand, it is also challenging to generate appropriate conversational actions using purely the reinforcement signal without imitation. The fundamental reason is the inability of speaking, thus the probability of generating a sensible sentence by randomly uttering is low, let alone that of a proper one. This is exemplified by the fact that babies don't fully develop their language capabilities without the ability to hear, which is one of the most important channels for language-related imitation.

In this patent document, joint imitation and reinforcement model embodiments for interactive language learning are disclosed that overcome both of these limitations. The disclosed model leverages both verbal and encouragement feedback from the teacher for joint learning, thus overcoming the difficulties encountered with either only imitation or reinforcement. Some of the contributions of this invention disclosure are summarized as follows:

- A novel human-like interaction-based grounded language learning setting is presented. In the setting, language is learned by interacting with the environment (teacher) in natural language.
- A grounded natural language learning approach is presented under the interactive setting by leveraging feedback from the teacher during interaction through joint imitation and reinforcement.

In embodiments, imitation and reinforcement are utilized jointly for grounded natural language learning in an interactive setting.

The patent disclosure document is organized as follows: Section B outlines a brief review of some related work on natural language learning. Section C introduces the formulation of the interaction-based natural language learning problem, followed with detailed explanation of embodiments. Section D discloses some detailed experiments to show the language learning ability of the proposed approach in the interactive setting. Section E lists some conclusions.

B. Related Work

Deep network based language learning has received great success recently and has been applied in different applications, for example, machine translation, image captioning/visual question answering and dialogue response generation. For training, a large amount of training data containing source-target pairs is needed, typically requiring a significant amount of efforts to collect. This setting essentially captures the statistics of the training data and does not respect the interactive nature of language learning thus is very different from how humans learn.

While conventional language model is trained in a supervised way, there are some recent works using reinforcement learning for training. These works mainly target the problem of tuning the performance of a language model pre-trained in a supervised way according to a specific reward function which is either directly the evaluation metric such as standard BLEU core, manually designed function, or metric learned in an adversarial setting, which is non-differentiable, leading to the usage of reinforcement learning. Different from them, one of the main focuses herein is on the possibility of language learning in an interactive setting and model designs, rather than optimizing a particular model output towards a specific evaluation metric.

There are some works on learning to communicate and the emergence of language. The emerged language need to be interpreted via post-processing. Differently, embodiments in this disclosure aims to achieve natural language learning from both perspectives of understanding and generation (i.e., speaking), thus the speaking action of the agent is readily understandable without any post-processing. There are also works on dialogue learning using a guesser/responder setting where the guesser tries to achieve the final goal (e.g., classification/localization) by collecting additional information through asking questions to the responder. These works try to optimize the question to be asked in order to help the guesser to achieve the final guessing goal. Thus, the focus is very different from the goal of language learning through interactions with a teacher as in embodiments herein.

An aspect herein is also related to reinforcement learning based control with natural language action space in the sense that the model embodiments also output action in natural language space. In embodiments, language learning through textual dialogue has been explored. In some related works, a set of candidate sequences is provided, and the action required is selecting one from the candidate set, thus is essentially a discrete control problem. In contrast, embodiments of this disclosure achieve sentence generation through control in a continuous space, with a potentially infinite sized action space comprises all possible sequences.

C. Embodiments of Interaction-Based Language Learning

In this section, embodiments of the proposed interaction-based natural language learning approach are introduced. A goal is to design a learning agent (the term "agent" may b be used interchangeably with "learner" according to context in the document) that can learn to converse by interacting with the teacher, which can be either a virtual teacher or a human (see FIGS. 1-2). At time step t, according to a visual image v, teacher generates a sentence $w^t$ which can be a question (e.g., "what is on the east", "where is apple"), a statement (e.g., "banana is on the north"), or an empty sentence (denoted as "."). The learner takes the teacher's sentence $w^t$ and the visual content v, and produces a sentence response $a^t$ to the teacher. The teacher will then provide feedback to the learner according to its response in the form of both sentence $w^{t+1}$ and reward $r^{t+1}$. The sentence $w^{t+1}$ represents verbal feedback from teacher (e.g., "yes on the east is cherry", "no apple is on the east") and $r^{t+1}$ models the non-verbal confirmative feedback such as nodding/smile/kiss/hug, which also appears naturally during interaction. The problem is therefore to design a model that can learn grounded natural language from the teacher's sentences and reward feedback. While it might look promising to formulate the problem as supervised training by learning from the subset of sentences from the teacher with only positive rewards, this approach will not work because of the difficulties due to the changed of perspective as mentioned earlier. The formulation of the problem and details of the embodiments are presented below.

1. Problem Formulation

In embodiments, a response from the agent may be modeled as a sample from a probability distribution over the possible output sequences. Specifically, for one episode, given the visual input v and textual input $w^{1:t}$ from the teacher up to time step t, the response $a^t$ from the agent can be generated by sampling from a policy distribution $p_\theta^R(\cdot)$ of the speaking action:

$$a^t \sim p_\theta^R(a|w^{1:t}, v) \tag{1}$$

In embodiments, the agent interacts with teacher by outputting the utterance $a^t$ and receives the feedback from teacher at time step t+1 as $\mathcal{F} = \{w^{t+1}, r^{t+1}\}$. $w^{t+1}$ may be in the form of a sentence which represents a verbal confirmation/correction in accordance with $w^t$ and $a^t$, with prefixes (yes/no) added with a probability of half (see FIGS. 1-2). Reward $r^{t+1}$ may be a scalar-valued feedback, in which a positive value represents encouragement while negative value represents discouragement, according to the correctness of the agent utterance $a^t$. A task of interaction-based language learning can be stated as learning by conversing with the teacher and improving from the teacher's feedback $\mathcal{F}$. Mathematically, the problem may be formulated as the minimization of a cost function as follows:

$$\mathcal{L}_\theta = \mathcal{L}_\theta^I + \mathcal{L}_\theta^R = \mathbb{E}_S\underbrace{\left[-\sum_t \log p_\theta^I(w^{t+1} \mid w^{1:t}, v)\right]}_{\text{Imitation}} + \mathbb{E}_{p_\theta^R}\underbrace{\left[-\sum_t [\gamma]^t \cdot r^{t+1}\right]}_{\text{Reinforce}} \quad (2)$$

where $\mathbb{E}_S(\bullet)$ is the expectation over all the sentence sequences S generated from teacher, $r^{t+1}$ is the immediate reward received at time step t+1 after taking speaking action following policy $p_\theta^R(\bullet)$ at time step t, and $\gamma$ is the reward discount factor. $[\gamma]^t$ may be used to denote the exponentiation over $\gamma$ to differentiate it with superscript indexing. As for both components, the training signal may be obtained via interaction with the teacher; this task is termed as interaction-based language learning. For the imitation part, it essentially learns from the teacher's verbal response $w^{t+1}$, which can only be obtained as a consequence of its speaking action. For the reinforce part, it learns from the teacher's reward signal $r^{t+1}$, which is also obtained after taking the speaking action and received at the next time step. The proposed interactive language learning formulation integrates two components, which can fully leverage the feedback appearing naturally during conversational interaction:

In embodiments, Imitation plays the role of learning a grounded language model by observing the teacher's behaviors during conversion with the learner itself. This enables the learner to have the basic ability to speak within context. In embodiments, the training data here are the sentences from teacher, without any explicit labeling of ground-truth and is a mixture of expected correct response and others. One way of training may be by predicting the future. More specifically, in embodiments, the model is predicting the next future word at a word level and predicting the next language input (such as a next sentence) at a sentence level. Another important point is that it is in effect third person imitation, as the learner is imitating the teacher who is conversing with it, rather than another expert student who is conversing with the teacher.

In embodiments, Reinforce (Reinforce denotes the module embodiments that learn from the reinforcement/encouragement signal throughout the patent document and should be differentiated with the REINFORCE algorithm as appears in the literature) leverages the confirmative feedback from the teacher for learning to converse properly by adjusting the action policy distribution. It enables the learner to use the acquired speaking ability and adapt it according to feedback. Here the learning signal is presented in the form of a reward. This is analogous to baby's language learning process, who uses the acquired language skills by trial and error with parents and improves according to the encouragement feedback.

Note that while imitation and reinforce are represented as two separate components in Eq. (2), they may be tied via parameter sharing in order to fully leverage both forms of training signals. This form of joint learning can be important for achieving successful language learning, compared with approaches with only imitation or reinforce which are less effective, as verified by experiments in Section D.

2. Approach

Figure 3:
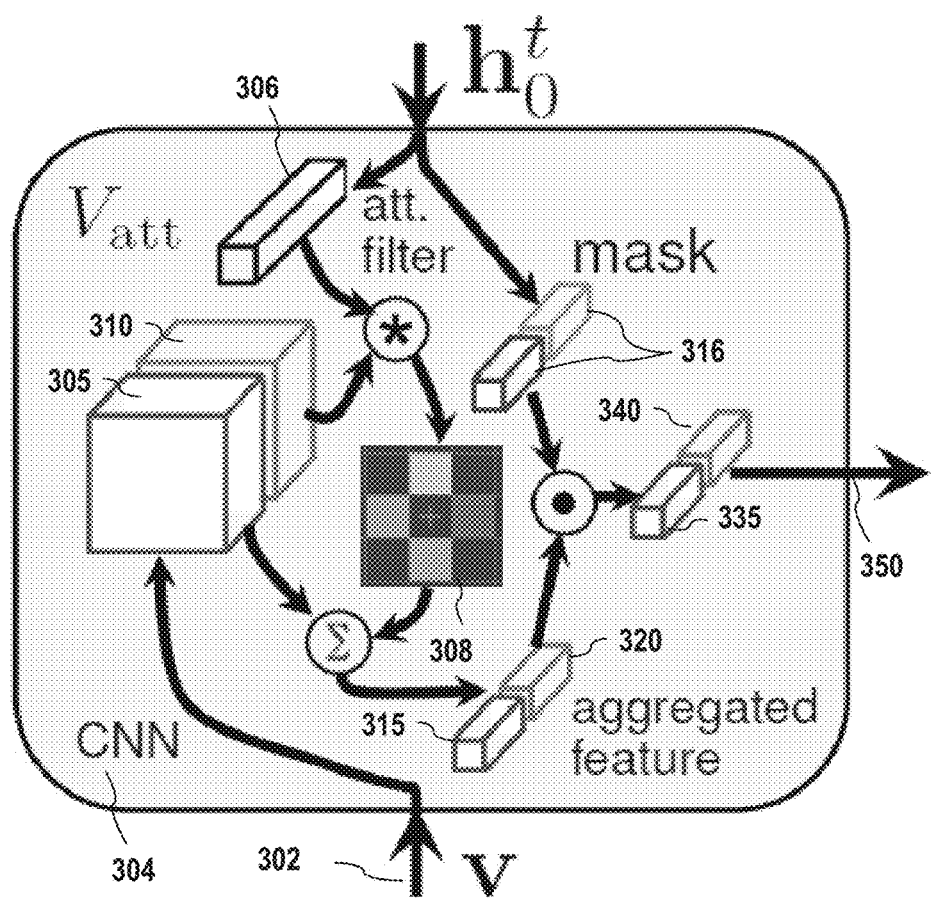
FIG. 3 graphically depicts a visual encoder network within a hierarchical-RNN-based model according to embodiments of the present disclosure.
Figure 4:
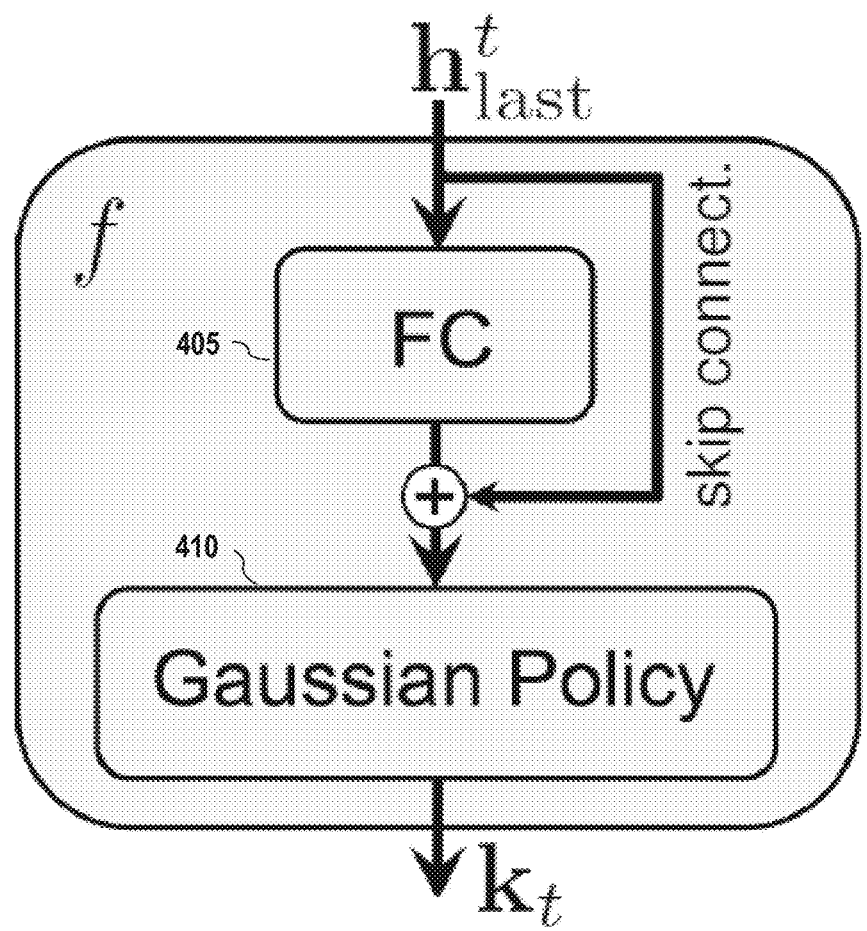
FIG. 4 graphically depicts a controller network within a hierarchical-RNN-based model according to embodiments of the present disclosure.

FIG. 2 shows a hierarchical Recurrent Neural Network (RNN) model embodiment 200 used for capturing the sequential structure both across sentences and within a sentence. In embodiments, the hierarchical RNN model embodiment 200 comprises an encoding-RNN 220, an action-RNN 240, and a controller 250. FIG. 3 depicts an exemplary visual encoder network embodiment 300 within the hierarchical-RNN-based model. FIG. 4 depicts an exemplary controller network embodiment 400 within the hierarchical-RNN-based model. The annotations corresponding to various algorithm icons shown in FIG. 2 are also applicable to FIG. 3 and FIG. 4.

Figure 5:
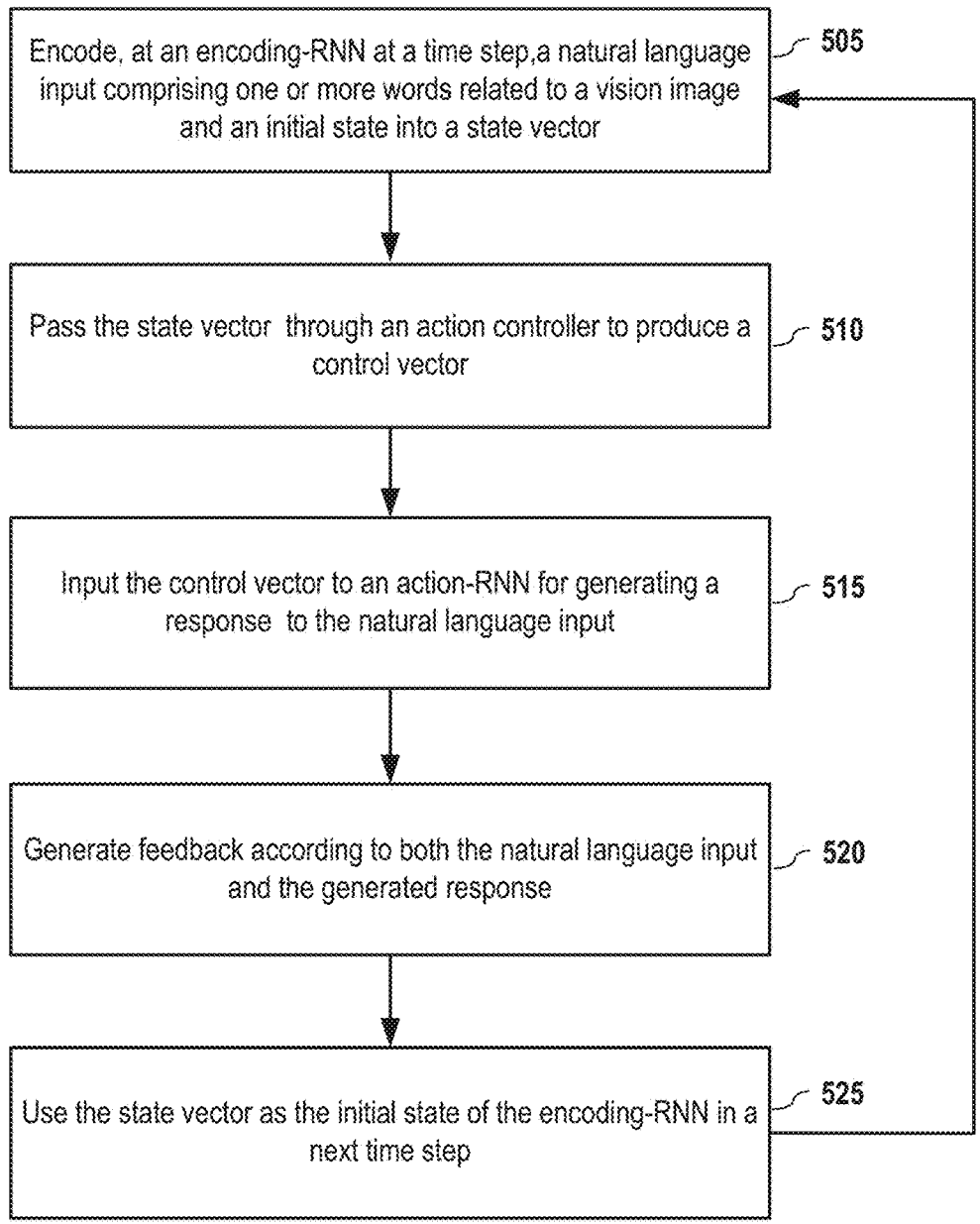
FIG. 5 depicts a method for interaction-based language learning according to embodiments of the present disclosure.

FIG. 5 shows a method for interaction-based language learning according to embodiments of the present disclosure. At a time-step t, the encoding-RNN 220 encodes (505) a natural language input $w^t$ comprising one or more words related to the visual image 202 from teacher and history information (or an initial state) into a state vector $h_{last}^t$. In some embodiments, the natural language input is a natural language sentence. In embodiments, the encoding-RNN 220 also receives an output of visual feature vector from the visual encoder 210 for the generation of the state vector $h_{last}^t$. Additional details of the visual encoder are described in FIG. 3. In step 510, the state vector $h_{last}^t$ is passed through an action controller 250 f(•) to produce a control vector $k^t$. In step 515, the control vector $k^t$ is input to the action-RNN for generating the response $a^t$ to the teacher's sentence. In embodiments, the action-RNN 240 also receives an output from a visual encoder 212 for the generation of the response $a^t$. Both visual encoders 210 and 212 perform visual encoding operation to the same visual image 202. In embodiments, visual encoders 210 and 212 share parameters. In step 520, the teacher generates feedback $\mathcal{F} = \{w^{t+1}, r^{t+1}\}$ according to both $w^t$ and $a^t$. In step 525, in addition to being used as input to action controller, the state vector is passed to the next time step and used as the initial state of the encoding-RNN in the next step (i.e., $h_0^{t+1} \triangleq h_{last}^t$) for learning from $w^{t+1}$, thus forming another level of recurrence at the scale of time steps.

At a time step t, the encoding-RNN takes teacher's sentence ("where is apple") and the visual feature vector from the visual encoder $V_{att}(\bullet)$ as inputs to generate the state vector $h_{last}^t$ which corresponds to the last state of the encoding-RNN at the time step t. The state vector $h_{last}^t$ is passed through a controller f(•) to the action-RNN for response generation. In embodiments, parameters are shared between the encoding-RNN and the action-RNN. During training, the RNN is trained by predicting next words and next sentences. After training, the parameters of the encoding-RNN and the action-RNN may be fixed.

Referring back to FIG. 4, an exemplary controller network embodiment 400 within the hierarchical-RNN-based model is shown. In embodiments the controller network comprises a residue control module 405 (such as a fully connected layer) followed by a Gaussian Policy module 410. Further details of the controller network 400 are described in Section 2.2.

2.1 Embodiments of Imitation with Hierarchical-RNN-Based Language Modeling

In embodiments, the teacher's way of speaking provides a source for the learner to mimic. One way to learn from this source of information is by predictive imitation. Specifically, for a particular episode, the probability of the next language input (such as next sentence) $w^{t+1}$ conditioned on the previous language inputs (such as previous sentences) $w^{1:t}$ and current image v may be represented as:

$$p_\theta^I(w^{t+1}|w^{1:t},v) = p_\theta^I(w^{t+1}|h_{last}^t,v) = \Pi_i p_\theta^I(w_i^{t+1}|w_{1:i-1}^{t+1}, h_{last}^t, v) \quad (3)$$

where $h_{last}^t$ is the last state of RNN at time step t as the summarization of $w^{1:t}$ (see FIG. 2) and i indexes words within a sentence. It is natural to model the probability of the i-th word in the t+1-th sentence with an RNN as well, where the sentences up to t and words up to i within the t+1-th sentence conditioned upon is captured by a fixed-length hidden state vector as $h_i^{t+1} = RNN(h_{i-1}^{t+1}, w_i^{t+1})$ thus $$p_\theta^I(w_i^{t+1}|w_{1:i-1}^{t+1}, h_{last}^t, v) = \mathrm{softmax}(W_h h_i^{t+1} + W_v V_{att}(v, h_0^{t+1}) + b) \quad (4)$$

where $W_h$, $W_v$ and b denote the transformation weight and bias parameters respectively. $V_{att}(\bullet)$ denotes the visual encoding network with spatial attention incorporated as shown in FIG. 3. $V_{att}(\bullet)$ takes the initial RNN state $h_0^t$ and visual image v as input.

Figure 6:
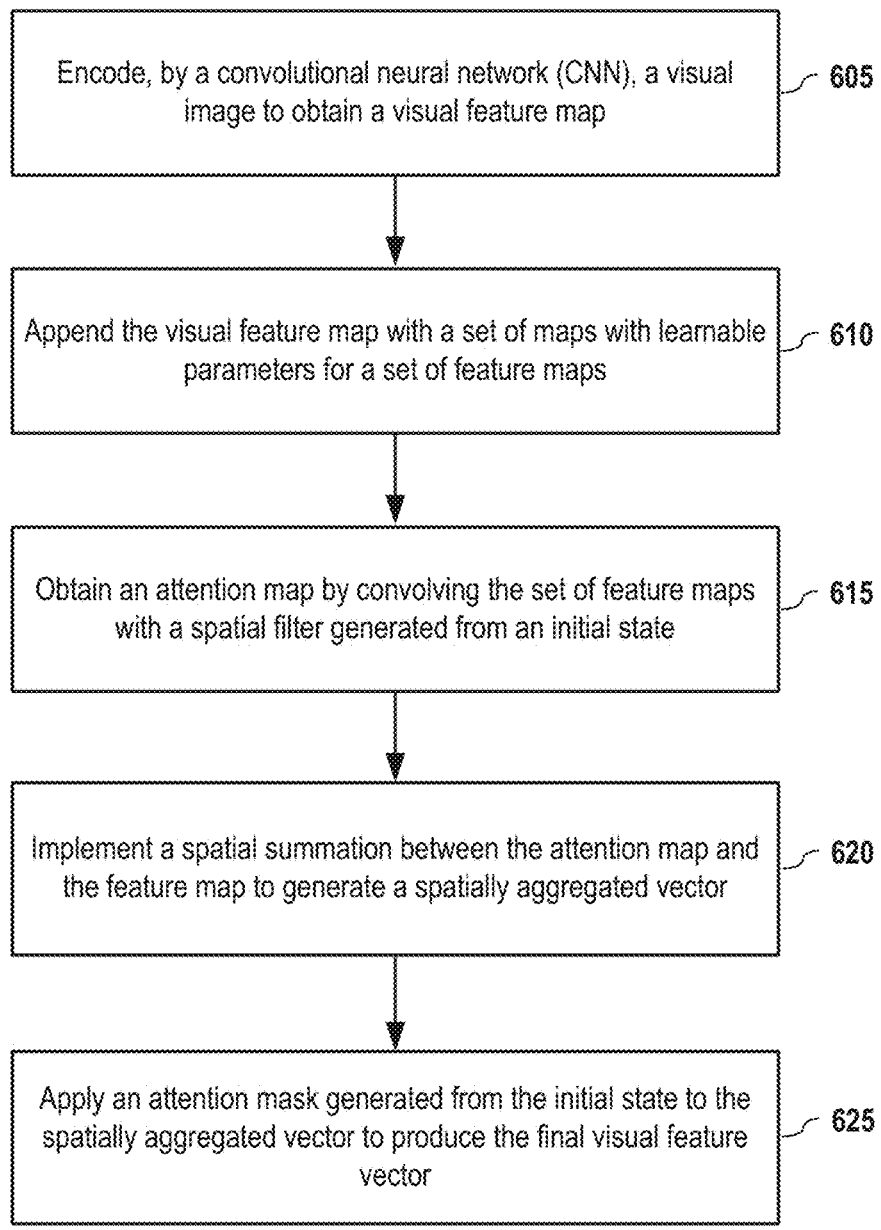
FIG. 6 depicts a method for generating visual feature vector with the visual encoder according to embodiments of the present disclosure.

FIG. 6 shows a method to generate visual feature vector with the visual encoder 300 according to embodiments of the present disclosure. The visual encoder 300 may be referred as the visual encoder 210 or 212 in FIG. 2. In step 605, a visual image 302 is first encoded by a convolutional neural network (CNN) 304 to obtain the visual feature map (cube 305 in FIG. 3).

In embodiments, the visual feature map is appended (in step 610) with another set of maps (cube 310 in FIG. 3) with learnable parameters for encoding the directional information to generate a concatenated feature map (cube 305 concatenated with cube 310 in FIG. 3). The learnable set of maps (cube 310 in FIG. 3) is generated by creating a cube of the same size as the visual feature map (cube 305) with all values initialized as zero and can be modified by the learning algorithm during training.

In step 615, an attention map 308 is obtained by convolving the concatenated feature map with a spatial filter 306 generated from an initial RNN state $h_0^t$. In step 620, a spatial summation is implemented between the attention map and the concatenated feature map to generate a spatially aggregated vector (315 concatenated with 320 in FIG. 3). In step 625, an attention mask 316 for emphasizing visual or directional features generated from $h_0^t$ is applied to the spatially aggregated vector (315 concatenated with 320 in FIG. 3) to produce the final visual feature vector (335 concatenated with 340 in FIG. 3). The final visual feature vector is used as an output 350 to the encoding-RNN 220 or action-RNN 240. In embodiments, the final visual feature vector is produced by implementing a Hadamard product between the binary attention mask 316 and the spatially aggregated vector 315. The initial state of the encoding-RNN is the last state of the previous RNN, i.e., $h_0^{t+1} = h_{last}^t$ and $h_0^0 = 0$.

A language model trained this way will have the basic ability of producing a sentence conditioned on the input. Therefore, when connecting an encoding-RNN with an action-RNN directly, i.e., inputting the last state vector from the encoding-RNN into the action-RNN as the initial state, the learner will have the ability to generate a sentence by mimicking the way teacher speaks, due to parameter sharing. However, this basic ability of speaking may not be enough for the learner to converse properly with teacher, which requires the incorporation of reinforcement signals as detailed in the following section.

2.2 Embodiments of Learning Via Reinforcement for Sequence Actions

In embodiments, an agent will generate an action according to $p_\theta^R(a|w^{1:t},v)$. In embodiments, as sentences $w^{1:t}$ can be summarized as the last RNN state $h_{last}^t$, the action policy distribution may be represented as $p_\theta^R(a|h_{last}^t,v)$. To leverage the language skill that is simultaneously learned from imitation, the sentence may be generated using a language model shared with imitation, but with a modulated conditional signal via a controller network $f(\bullet)$ as follows (see FIG. 2 and FIG. 4):

$$p_\theta^R(a^t|h_{last}^t,v) = p_\theta^I(a^t \triangleq w^{t+1}|f(h_{last}^t),v). \quad (5)$$

The reason for incorporating a controller $f(\bullet)$ for modulation is that the basic language model offers the learner the ability to generate a sentence, but not necessarily the ability to respond correctly, or to answer a question from teacher properly. Without any additional module, the agent's behaviors would be the same as those from the teacher because of parameter sharing, thus the agent cannot learn to speak correctly in an adaptive manner by leveraging the feedback from the teacher.

Figure 7:
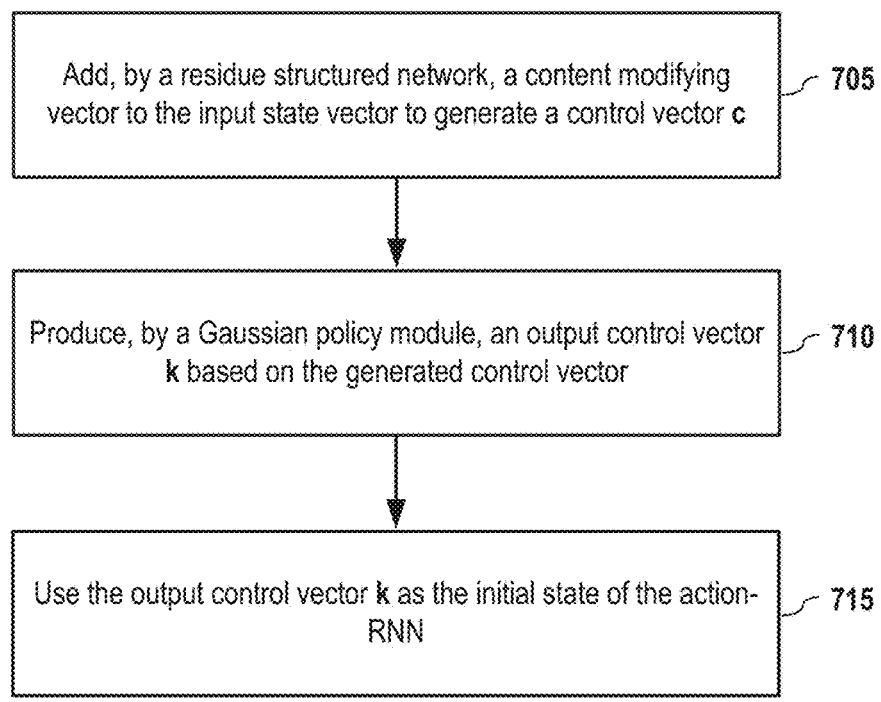
FIG. 7 depicts a method for generating a control vector with a controller network according to embodiments of the present disclosure.

FIG. 7 depicts a method for generating a control vector with a controller network according to embodiments of the present disclosure. In embodiments, the controller $f(\bullet)$ 400 is a composite network with two components: (1) a residue structured network 405 for transforming the encoding vector $h_{last}^t$ in order to modify the behavior; and (2) a Gaussian policy module 410 for generating a control vector from a Gaussian distribution conditioned on the transformed encoding vector from the residue control network as a form of exploration. In embodiments, a gradient-stopping layer (not shown in FIG. 4) may also be incorporated between the controller and its input, to encapsulate all the modulation ability within the controller.

Residue Control.

In embodiments, the action controller has the property that it can pass the input vector to the next module unmodified when being able to modify the content of the input vector otherwise. In step 705, a residue structured network adds a content modifying vector to the original input state vector (i.e., skip connection) as follows:

$$c = \tau(h) + h \quad (6)$$

where $\tau(\bullet)$ is a content transformation network (or a transformer network) and c is the generated control vector (or the transformed state vector). The reason for including a skip connection is that it offers the ability to leverage the language model simultaneously learned via imitation for generating sensible sentences and the transformation network. $\tau(\bullet)$ includes learnable parameters for adjusting the behaviors via interactions with the environment and feedback from the teacher. In embodiments, $\tau(\bullet)$ is implemented as two fully-connected layers with ReLU (Rectified Linear Unit) activation.

Gaussian Policy.

In embodiments, Gaussian policy network models the output vector as a Gaussian distribution conditioned on the input vector. In step 710, the Gaussian policy module receives the generated control vector c as input and produces an output control vector k, which is used (715) as the initial state of the action-RNN. The Gaussian policy is modeled as follows:

$$p_\theta^R(k|c) = \mathcal{N}(c, \Gamma^T \Gamma), \Gamma = \mathrm{diag}[\gamma(c)]. \quad (7)$$

wherein $\mathcal{N}$ is a normal distribution function, $\Gamma$ is a covariant matrix that is learned, $\gamma(\bullet)$ is a sub-network for estimating the standard derivation vector and may be implemented using a fully-connected layer with ReLU activation.

The incorporation of Gaussian policy introduces stochastic unit into the network, thus backpropagation cannot be applied directly. Therefore, a policy gradient algorithm may be used for optimization. In embodiments, a small value (0.01) is added to γ(c) as a constrain of the minimum standard deviation. The vector k generated from the controller may then be used as the initial state of action-RNN and the sentence output is generated using beam search (c.f. FIG. 2). In embodiments, for the reward $r^{t+1}$ in Eqn. (2), a baseline is introduced for reducing variance as $r^{t+1} - V_v(v)$, where $V_v(\bullet)$ represents the value network with parameter vector v and is estimated by adding to $\mathcal{L}^R$ an additional value network cost $\mathcal{L}^V$ as follows:

$$\mathcal{L}^V = \mathbb{E}_{p_\theta^R}(r^{t+1} + \lambda V_{v^-}(v^{t+1}) - V_v(v^t))^2 \tag{8}$$

where v denotes the set of parameters in the value network and $V_{v^-}(\bullet)$ denotes the target version of the value network, whose parameter vector $v^-$ is periodically copied from the training version.

2.3 Embodiments of Training

Training involves optimizing the stochastic policy by using the teacher's feedback $\mathcal{F}$ as a training signal, obtaining a set of optimized parameters by considering jointly imitation and reinforcement as shown in Eq. (2). Stochastic gradient descent is used for training the network. For $\mathcal{L}^I$ from the imitation module, its gradient may be obtained as:

$$\nabla_\theta \mathcal{L}^I = -\mathbb{E}_S[\nabla_\theta \Sigma_t \log p_\theta^I(w^{t+1}|w^{1:t}, v)] \tag{9}$$

Using a policy gradient theorem, the following gradient for the reinforce module may be obtained as:

$$\nabla_\theta \mathcal{L}_\theta^R = -\mathbb{E}_{p_\theta^R}[[\nabla_\theta \log p_\theta^R(k^t|c^t) + \nabla_v V_v(v)] \cdot \delta] \tag{10}$$

where δ is the td-error defined as $\delta = r^{t+1} + \gamma V_v(v) - V_v(v)$. In embodiments, the network is trained with Adagrad with a batch size of 16 and a learning rate of $1 \times 10^{-5}$. A discount factor of γ=0.99 may be used. In embodiments, experience replay is used in practice.

D. Various Experiments Results

The performance of embodiments of the approach presented herein were evaluated under several different settings to demonstrate its ability of interactive language learning. For training efficiency, a simulated environment was constructed for language learning as shown in FIG. 1. Four different objects are considered around the learner in each direction (S, N, E, W), which are randomly sampled from a set of objects for each session. Within this environment, a teacher interacts with the agent about objects that are around in three different forms: (1) asking a question as "what is on the south", "where is apple" and the agent answers the question; (2) describing objects around as "apple is on the east" and agents repeat the statement; (3) saying nothing (".") then agent describes objects that are around and gets a feedback from the teacher. The agent receives a positive reward (e.g., r=+1) if it behaves correctly (generates a correct answer to a question from the teacher or produces a correct statement if the teacher says nothing) and a negative reward (e.g., r=−1) otherwise. Reward is used to represent the teacher's non-verbal feedback such as nodding as a form of encouragement. Besides reward feedback, teacher also provides a verbal feedback including the expected answer in the form of "X is on the east" or "on the east is X" and with prefix ("yes/no") added with a probability of half. The speaking action from the agent is correct if it outputs a sentence that matches exactly with the expected answer in one of the above forms. There is a possibility for the learner to generate a new correct sentence that beyond teacher's knowledge.

Language Learning Evaluation:

The basic language learning ability of the proposed approach is firstly validated under the interactive language learning setting. In this setting, the teacher first generates a sentence for the learner, then the learner will respond, and the teacher will provide feedback in terms of a sentence and a reward. In embodiments, the embodiment is compared with two baseline approaches:

Reinforce, which uses directly reinforcement for learning from teacher's reward feedback; and Imitation, which learns by mimicking teacher's behavior.

Figure 8:
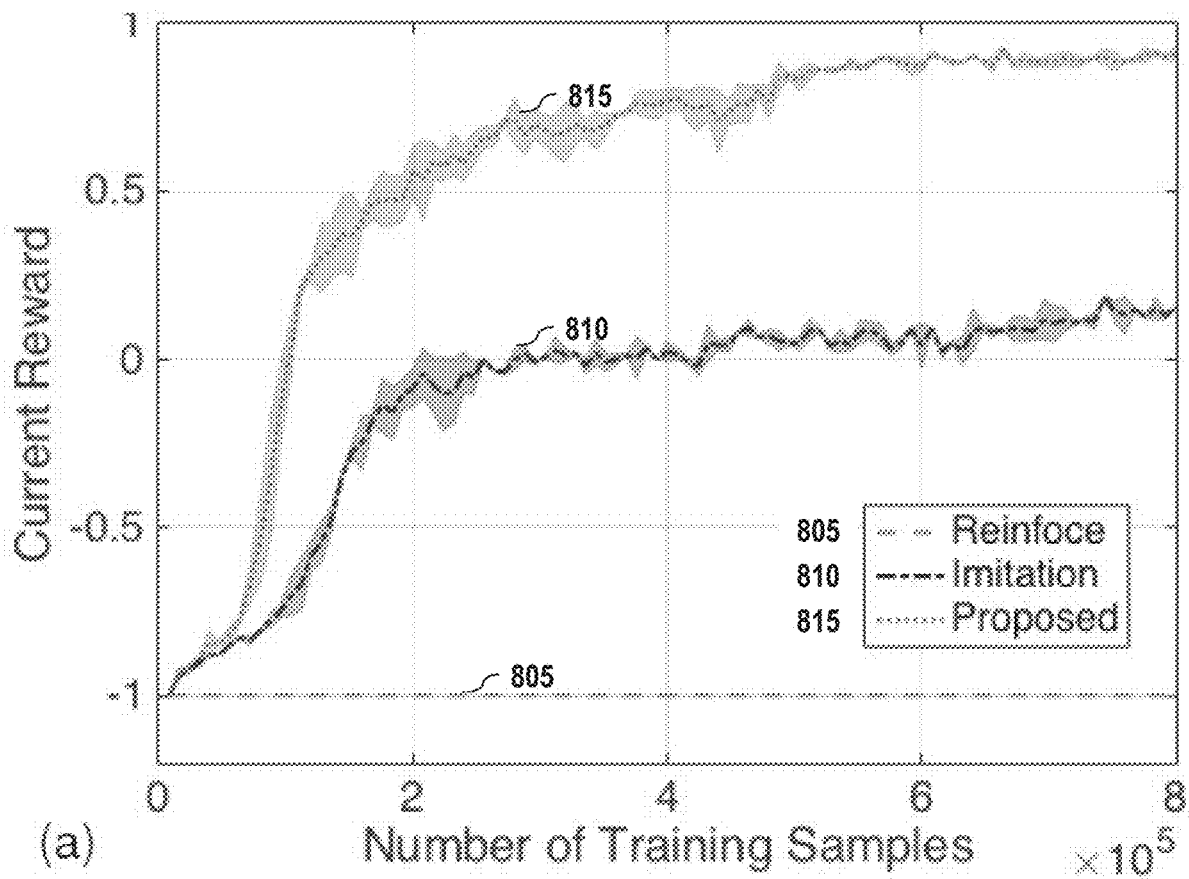
FIG. 8 depicts some results of language learning evaluation according to embodiments of the present disclosure.

Experimental results are shown in FIG. 8. It is interesting to note that learning directly from reward feedback only (Reinforce) 805 does not lead to successful language acquisition. This is mainly because of the low possibility of generating a sensible sentence by random exploration, and the even lower possibility of generating the correct sentence, thus the received reward can stay at −1. On the other hand, the Imitation approach 810 performs better than Reinforce, due to the speaking ability it gained through mimicking. The embodiment 815 achieves higher reward than both compared approaches, due to the effectiveness of the joint formulation, which can fully leverage the feedback signals appeared naturally during conversion for learning. This indicates the effectiveness of the proposed approach for language learning under the interactive setting.

Figure 9A:
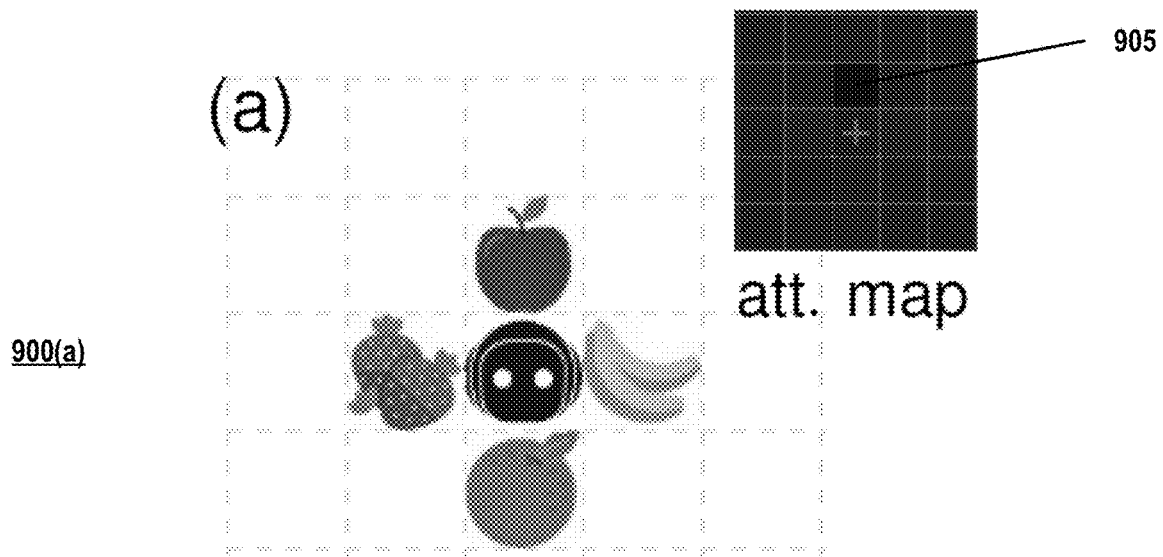
FIG. 9A-D depicts some visualized examples along with generated attention maps, with FIGS. 9A and 9B corresponding to what questions, FIG. 9C corresponding to where question, and FIG. 9D corresponding to situation that teacher says nothing, according to embodiments of the present disclosure.
Figure 9B:
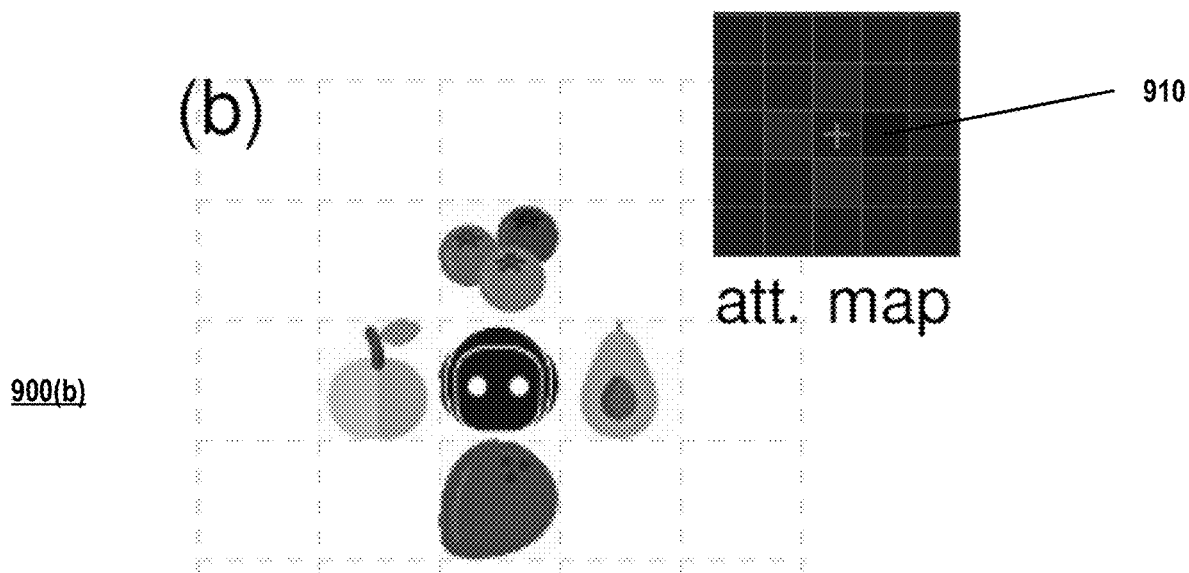
Figure 9C:
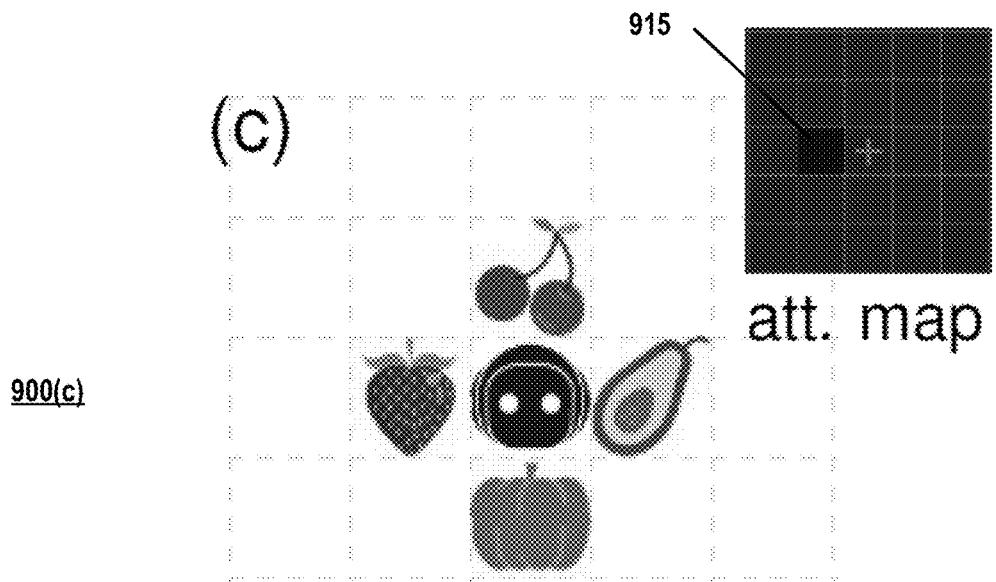
Figure 9D:
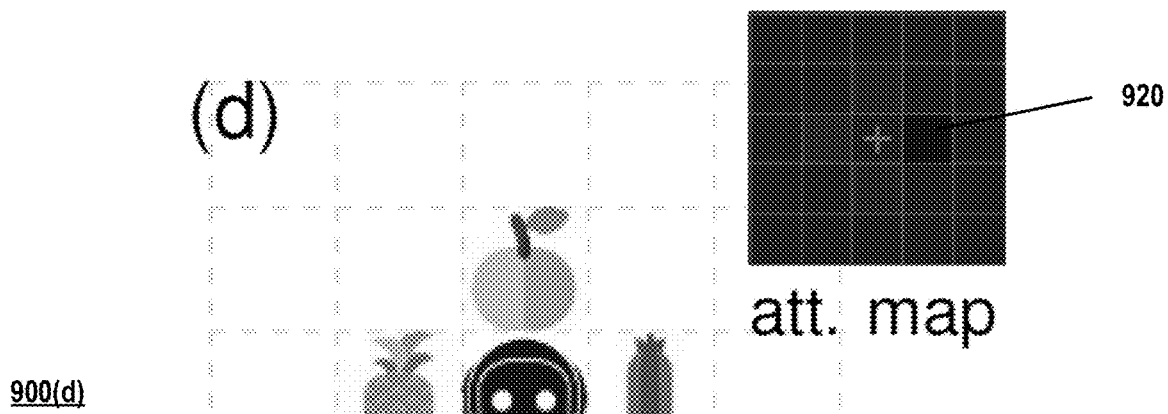

Similar behaviors have been observed during testing. Some examples are further visualized as shown in FIG. 9A-D along with the generated attention maps. FIGS. 9A and 9B correspond to what questions; FIG. 9C corresponds to where question; and FIG. 9D corresponds to situation that teacher says nothing (".") and the agent is expected to produce a statement. For each example, the visual image is shown, with the conversion dialogues between the teacher and the learner, as well as the attention map (att. map) generated from the learner when producing the response to teacher (overlaid on top-right). The attention map is rendered as a heat map, with annotated reference number (905, 910, 915, or 920 on corresponding FIG. 9A, FIG. 9B, FIG. 9C, or FIG. 9D, respectively) indicating large value while non-annotated area indicating small value. Grid lines are overlaid on top of the attention map to for visualization purpose. The position of the learner is marked with a cross in the attention map (T/L: teacher/learner, [+/−]: positive/negative rewards).

As can be observed from the results, the tested embodiment can successfully generate correct attention maps for both what and where questions. When the teacher says nothing ("."), the agent can generate a statement describing an object that is around correctly.

Zero-Shot Dialogue.

In embodiments, an intelligent agent is expected to have an ability to generalize. In embodiments, Zero-shot Dialogue was used as a way to assess the language learning ability of an approach. Experiments were done in following two settings.

(1) Compositional generalization: the learner interacts with the teacher about objects around during training, but does not have any interaction with certain objects (referred to as inactive objects) at particular locations, while in testing the teacher can ask questions about an object regardless of its location. It is expected that a good learner should be able to generalize the concepts it learned about both objects and locations as well as the acquired conversation skills and can interact successfully in natural language with teacher about novel {object, location} combinations that it never experienced before.

(2) Knowledge transferring: The teacher asks the learner questions about the objects that are around. For certain objects, the teacher only provides descriptions without asking questions during training, while in testing, the teacher can ask questions about any object present in the scene. The learner is expected to be able to transfer the knowledge learned from teacher's description to generate an answer to teacher's question about these objects. Experiments were carried out under these two settings for two configurations (mixed and held-out) and experimental results are summarized in Table 1 and Table 2, respectively. Mixed configuration denotes the case in which a mixture of interactions with all objects regardless of whether they are active or inactive during training. Held-out configuration denotes the case involving interactions with only the objects that are inactive during training.

The results show that the Reinforce approach performs poorly under both settings due to the lack of basic language-related abilities as mentioned in the previous section. The Imitation approach performs better than Reinforce mainly due to its language speaking ability through mimicking. Note that the held-out configuration is a subset of the mixed-configuration involving only novel objects/combinations, thus is more difficult than the mixed case. It is interesting to note that the tested embodiment maintains a consistent behavior under the more difficult held-out configuration and outperforms the other two approaches under both settings, demonstrating its effectiveness in interactive language learning.

TABLE 1

Testing Results with Mixed Configuration

| Settings | Reinforce | Imitation | Proposed |
|---|---|---|---|
| Compositional-gen. | 0.0% | 83.7% | 98.9% |
| Knowledge-transfer | 0.0% | 81.6% | 97.5% |

TABLE 2

Testing Results with Held-out Configuration

| Settings | Reinforce | Imitation | Proposed |
|---|---|---|---|
| Compositional-gen. | 0.0% | 75.1% | 98.3% |
| Knowledge-transfer | 0.0% | 70.4% | 89.0% |

E. Various Conclusions

Disclosed herein are embodiments of an interactive setting for grounded natural language learning and embodiments that achieve effective interactive natural language learning by fully leveraging the feedback that arises naturally during interactions through joint imitation and reinforcement. Experimental results show that the embodiments provide an effective way for natural language learning in the interactive setting and enjoys desirable generalization and transferring abilities under several different scenarios. It shall be noted that embodiments may include or incorporate explicit modeling of learned knowledge and fast learning about new concepts; as well as connecting the language learning task presented in this disclosure with other heterogeneous tasks such as navigation.

F. System Embodiments

In embodiments, aspects of the present patent disclosure may be directed to, implemented on, or utilize one or more information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 10:
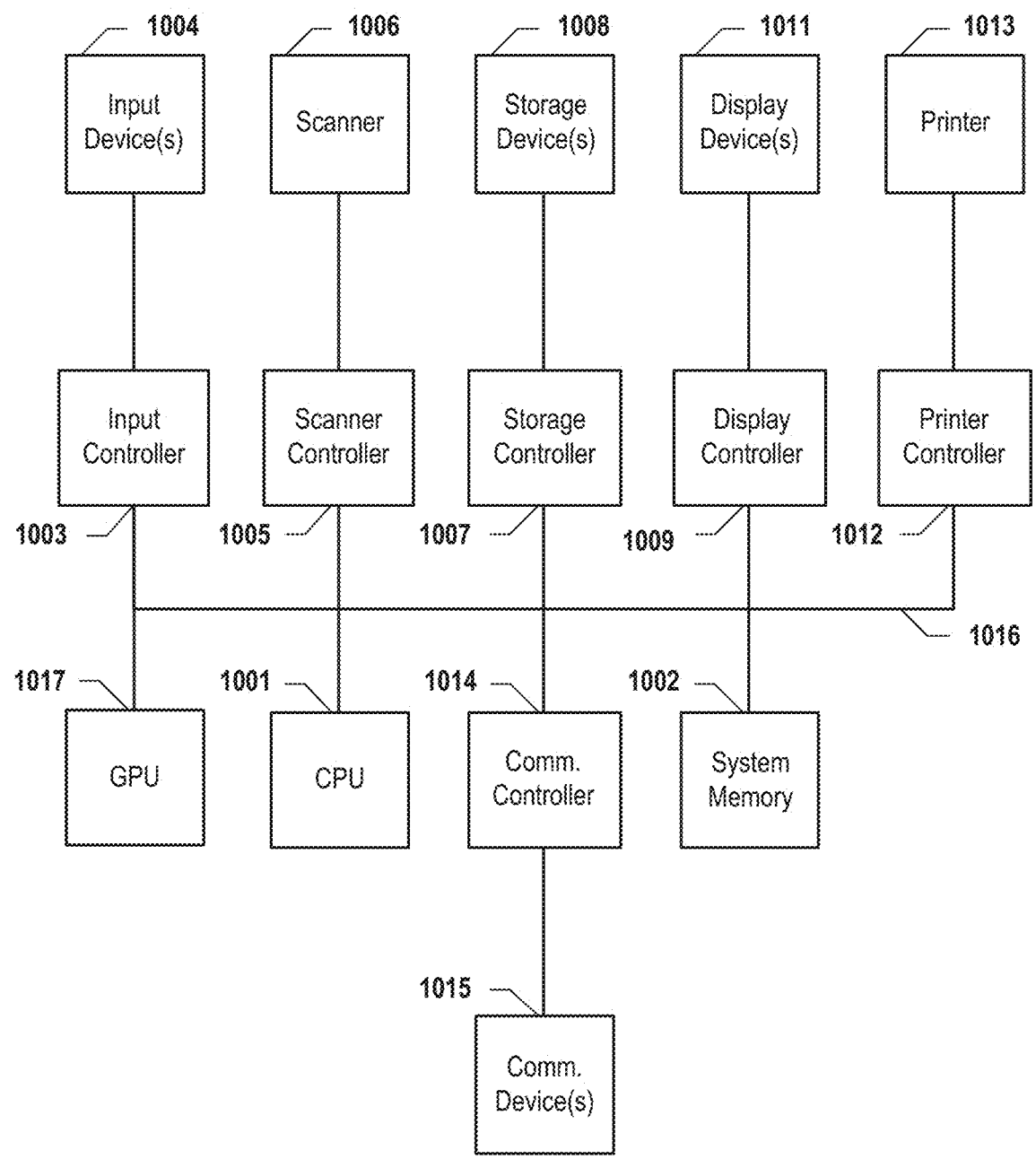
FIG. 10 depicts a simplified block diagram of a computing device/information handling system, in accordance with embodiments of the present document.

FIG. 10 depicts a simplified block diagram of a computing device/information handling system (or computing system) according to embodiments of the present disclosure. It will be understood that the functionalities shown for system 1000 may operate to support various embodiments of an information handling system—although it shall be understood that an information handling system may be differently configured and include different components.

As illustrated in FIG. 10, system 1000 includes one or more central processing units (CPU) 1001 that provides computing resources and controls the computer. CPU 1001 may be implemented with a microprocessor or the like, and may also include one or more graphics processing units (GPU) 1017 and/or a floating-point coprocessor for mathematical computations. System 1000 may also include a system memory 1002, which may be in the form of random-access memory (RAM), read-only memory (ROM), or both.

A number of controllers and peripheral devices may also be provided, as shown in FIG. 10. An input controller 1003 represents an interface to various input device(s) 1004, such as a keyboard, mouse, or stylus. There may also be a scanner controller 1005, which communicates with a scanner 1006. System 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present invention. Storage device(s) 1008 may also be used to store processed data or data to be processed in accordance with the invention. System 1000 may also include a display controller 1009 for providing an interface to a display device 1011, which may be a cathode ray tube (CRT), a thin film transistor (TFT) display, or other type of display. The computing system 1000 may also include a printer controller 1012 for communicating with a printer 1013. A communications controller 1014 may interface with one or more communication devices 1015, which enables system 1000 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of the claims may be arranged differently including having multiple dependencies, configurations, and combinations.

What is claimed is:

1. A computer-implemented method for interaction-based language learning, the method comprising:
    encoding, at an encoding neural network, at a time step, a natural language input comprising one or more words related to an image, a visual feature representation, which is a representation of the image, and an initial state into a state representation;
    producing, at a control network, an output control representation based on the state representation;
    generating, at an action neural network, a response to the natural language input using the output control representation and the visual feature representation of the image;
    generating feedback, which comprises both a next natural language input and a reward, in which the next natural language input of the feedback is generated using a teacher that receives as inputs the natural language input, the visual feature representation, and the response; and
    using the next natural language input of the feedback from the teacher in training at least one of the action neural network or the encoding neural network and using the reward of the feedback in training the control network.

2. The computer-implemented method of claim 1 further comprising:
    using the state representation as an initial state in a next time step for encoding process in the next time step.

3. The computer-implemented method of claim 1 wherein the encoding neural network and action neural network both comprise a recurrent neural network (RNN).

4. The computer-implemented method of claim 1 wherein the encoding neural network and action neural network share parameters.

5. The computer-implemented method of claim 1 wherein the reward is a scalar-valued feedback from the teacher with a positive value as encouragement or a negative value as discouragement according to correctness of the response.

6. The computer-implemented method of claim 1 wherein the encoding-neural network receives the visual feature representation from a visual encoder.

7. The computer-implemented method of claim 6 wherein the visual feature representation is generated by the visual encoder by performing steps comprising:

encoding, by a convolutional neural network (CNN) within the visual encoder, the image to obtain a visual feature map;

appending the visual feature map with a set of maps with learnable parameters to generate a concatenated feature map;

obtaining an attention map by convoluting the concatenated feature map with a spatial filter generated from the initial state;

implementing a spatial summation between the attention map and the visual feature map to generate a spatially aggregated representation; and applying an attention mask generated from the initial state to the spatially aggregated representation to produce the visual feature representation.

8. The computer-implemented method of claim 1 wherein producing the output control representation based on the state vector representation comprises:

generating, at a residue structured network, a control representation using the state representation and a transformer network operating on the state representation; and generating, at a policy module, the output control representation using the generated control representation in which the policy module models the output control representation as a distribution conditioned on the generated control representation.

9. The computer-implemented method of claim 8 further comprising:

using the output control representation as an initial state for the action neural network.

10. A computer-implemented method for language learning in an interactive setting, the method comprising:

receiving, at a time step, a natural language input comprising one or more words related to an image;

generating a visual feature representation based at least on the image;

generating, by an encoding recurrent neural network (encoding-RNN), a state representation corresponding to the time step using at least the natural language input and the visual feature representation;

generating, by a controller network, an output control representation based at least on the state representation;

generating, at an action-RNN, a response to the natural language input and the image, with the output control representation used as an initial state of the action-RNN;

generating feedback comprising both a reward and another natural language input in a next time step, in which the another natural language input is generated by a teacher using as inputs the natural language input, the visual feature representation, and the response; and training at least one of the encoding-RNN and the action-RNN using the generated feedback.

11. The computer-implemented method of claim 10 wherein generating the state representation corresponding to the time step is further based on an initial state of the encoding-RNN at the time step, the initial state is history information obtained in a previous time step.

12. The computer-implemented method of claim 10 wherein the reward has a positive value as encouragement or a negative value as discouragement according to correctness of the response.

13. The computer-implemented method of claim 10 wherein stochastic gradient descent is used for training the encoding-RNN based on the natural language feedback from the teacher and wherein the controller network is trained using reinforcement learning using the reward.

14. The computer-implemented method of claim 10 wherein generating the output control representation based at least on the state representation comprises:

inputting the state representation into the controller network, which comprises:
a residue network, for affecting output for the action-RNN, that transforms the state representation to generate a control representation; and
a policy network, for generating the output control representation from a distribution conditioned on the control representation from the residue network; and outputting the output control vector representation.

15. The computer-implemented method of claim 14 wherein the residue network comprising a transformer network that comprises one or more fully-connected layers with an activation function.

16. The computer-implemented method of claim 15 wherein the transformer network comprises learnable parameters for adjusting interactions with the feedback.

17. A computer-implemented method for interactive language learning, the method comprising:

receiving, by a hierarchical Recurrent Neural Network (RNN) model at a time step, a natural language input comprising one or more words related to an image;

generating, by the hierarchical RNN model, a response to the natural language input; and receiving feedback comprising another natural language input and a reward, wherein the another natural language input is generated by a teacher using as inputs the natural language input, a visual feature representation, and the response;

wherein the hierarchical RNN model comprising:
an encoding recurrent neural network (encoding-RNN) to generate a state representation corresponding to the time step based at least on the natural language input and a visual feature representation extracted from the image;
a controller network to generate an output control representation based at least on the state representation; and
an action-RNN to generate the response to the natural language input with the output control representation used as an initial state of the action-RNN.

18. The computer-implemented method of claim 17 wherein the controller network is configured to:

add the state representation to an output of a transformer network operating on the state representation to generate a transformed state representation; and generate the output control representation from a Gaussian distribution conditioned on the transformed state representation.

19. The computer-implemented method of claim 17 wherein the controller network comprises a gradient-stopping layer as a pre-layer to the controller network.

20. The computer-implemented method of claim 17 wherein the controller network comprises a skip connection and wherein a residue network is the transformer network that operates on the state representation.

* * * * *